Sept. 21, 1954 R. C. FRENCH 2,689,714
METHOD AND APPARATUS FOR PREVENTING
THE CLOGGING OF DIFFUSER MEDIA
Filed Aug. 11, 1950 3 Sheets-Sheet 3
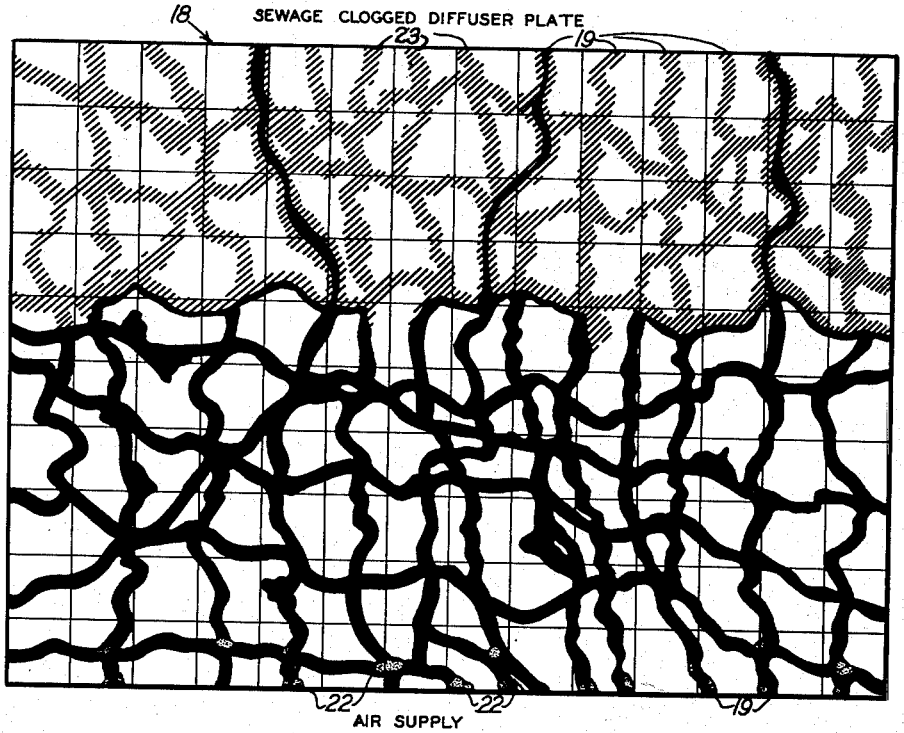
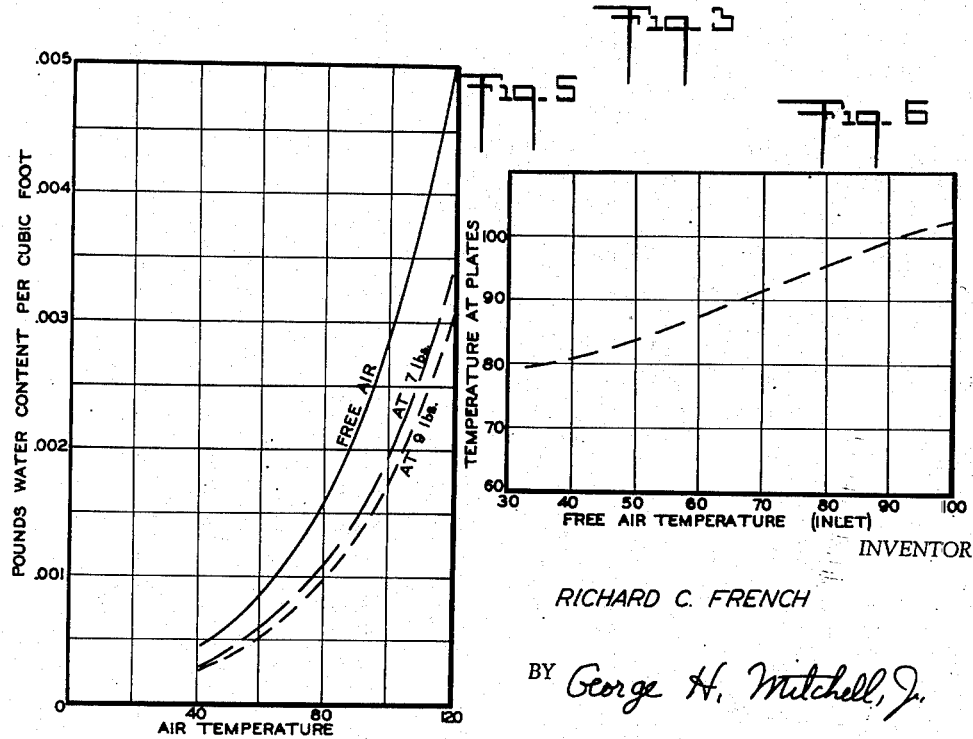
INVENTOR
RICHARD C. FRENCH
BY George H. Mitchell, Jr.

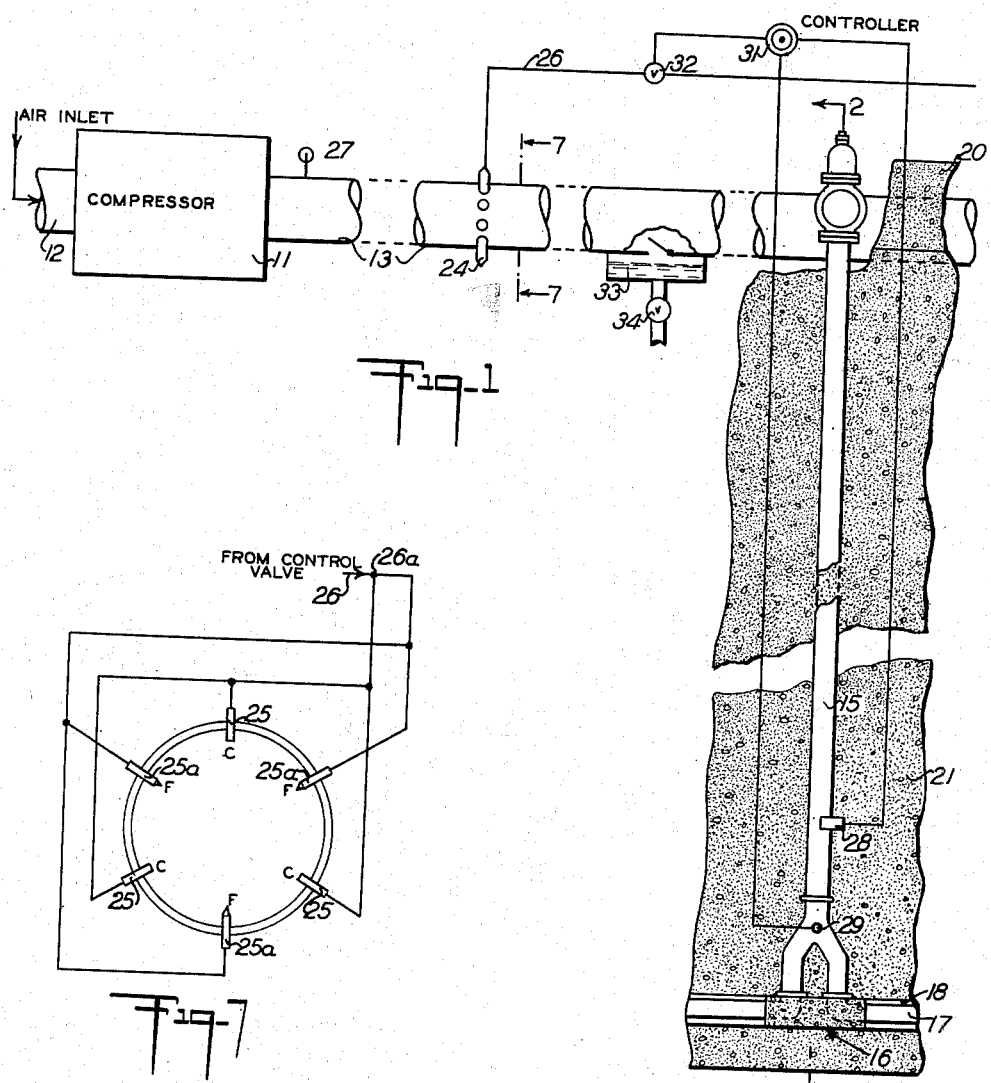

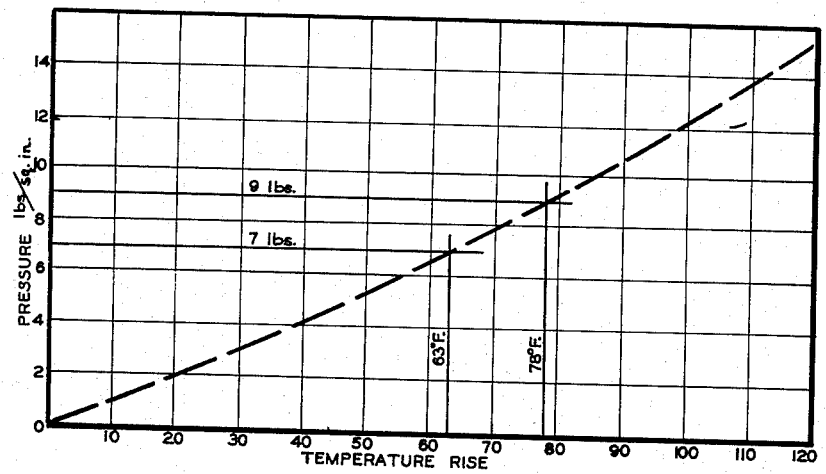
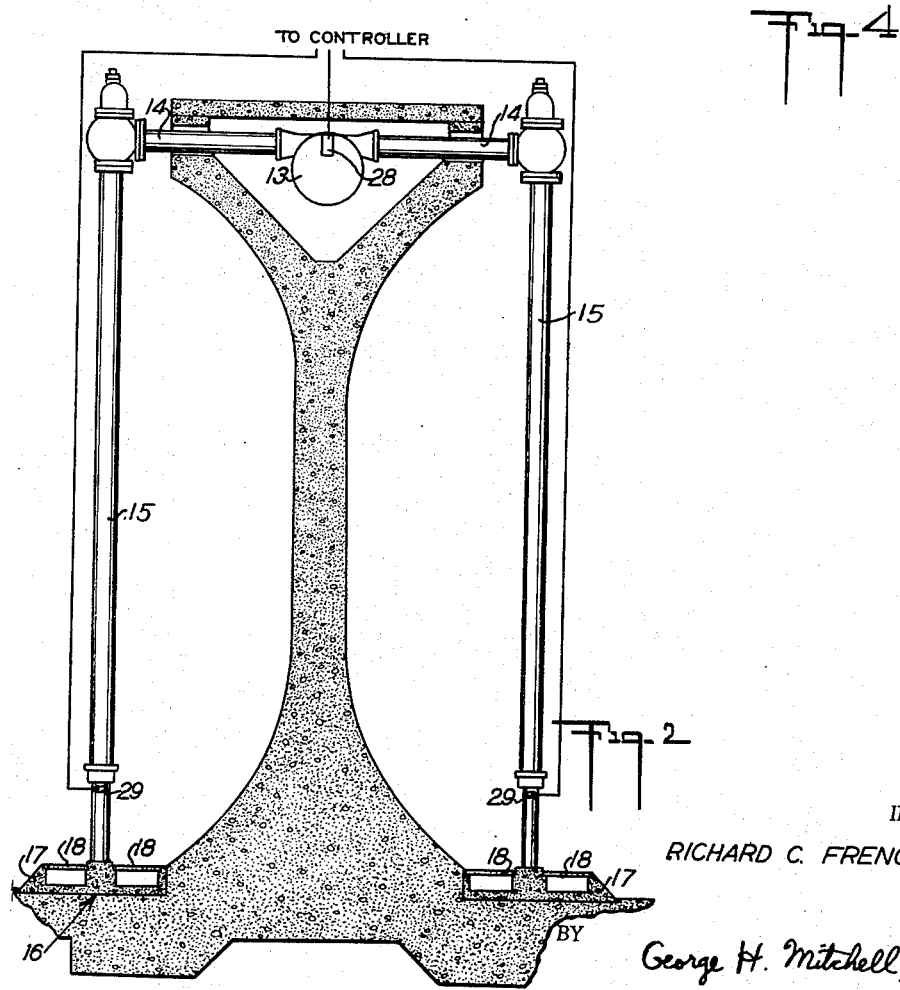

Patented Sept. 21, 1954

2,689,714

UNITED STATES PATENT OFFICE 2,689,714

METHOD AND APPARATUS FOR PREVENTING THE CLOGGING OF DIFFUSER MEDIA

Richard C. French, Brooklyn, N. Y.

Application August 11, 1950, Serial No. 178,927

8 Claims. (Cl. 261—39)

The present invention relates to the treatment of sewage, and more particularly to a process in which the treatment is by aeration. In the activated sludge process, for example, air is combined with sewage to react with and reduce its organic content by bacteriological action and oxidation. The air is commonly introduced near the bottom of large aeration tanks containing the sewage through porous diffuser media usually comprising relatively thin walls of inert material having many small and irregular passages which cause the air to be released into the sewage in the form of countless small bubbles.

Considerable difficulty has been encountered due to the fact that over a period of time the air passages in diffuser media used in this process tend to become clogged. This clogging necessarily slows down the aeration process, and makes it also necessary to increase the pressure of the air supplied to them, resulting in inefficiency of operation. This deterioration gradually proceeds until such a time as it becomes mandatory to put the tank out of service, drain it, and attempt to restore the porosity of the diffusers or replace them.

There are many well-known types of diffuser media which may be used in the activated sludge process. In general, they have these common characteristics; they are porous and made of substantially inert materials of a granular nature, compressed and bonded together to form relatively thin-walled structures having a wet side in contact with the sewage, and a dry side to which the air is supplied under pressure. For convenience, only one type of diffuser has been disclosed in this application. This type consists of a flat, rectangular plate of bonded granular material. A number of these plates are usually set in a row in the top of an open channel, or air distribution box, which runs the length of the aeration tank. However, it is to be understood that the present method and apparatus may be employed with other types of diffuser media, regardless of whether they be round, cylindrical, hemispherical, or irregularly shaped, which provide a multitude of passages to break up the air to be delivered to the sewage in the tank.

Diffuser media become clogged on both the wet and dry sides, but that which occurs in the passages near the wet side is by far the more extensive and troublesome. The wet clogging tends to occur with a high degree of uniformity in all passages adjacent the sewage and with considerable penetration inward from the wet surface.

Investigation has shown that dry clogging is mainly the result of the presence of dust and other foreign matter in the air supply which becomes lodged in the diffuser passages and tends to restrict the flow of air through some of the passages, and may even completely block others. The problem of preventing dry clogging appears to be one of proper filtering, or cleansing, of the air supply.

The nature and cause of wet clogging is less obvious. Inspection of cross-sections of the interior of clogged diffusers has revealed deposits of organic and inorganic materials extending from the wet surface deeply into the air passages. Analysis of these deposits tends to indicate that they include sewage solids in various stages of partial, and complete, oxidation. To understand how these deposits develop, it is necessary to consider the conditions of diffuser operation. Diffusers of this type are usually located near the bottom of sewage treatment tanks, and thus submerged under a considerable depth of liquid sewage. In order to overcome the head pressure offered by this body of liquid, and the resistance of the diffuser passages, air is supplied to the dry sides of the diffusers under pressure. The pressure will vary according to the condition of the diffuser passages, and for the plate type it may be as low as four pounds per square inch when the plates are new, increasing up to nearly ten pounds per square inch as clogging increases. When the pressure nears the higher value the volume of air passing into the sewage is reduced to a point where the process becomes inefficient, and the plates must be cleaned, or replaced.

It is apparent that, despite the pressure and volume of air passing into the sewage, there is set up some circulation of the liquid in a reverse direction. It is believed that, because of the inequality in the size of the minute openings in the diffuser media, various eddy currents are created by certain of the openings which tend to force liquid backwardly into adjacent openings of smaller size. There also appears to be present a capillary action tending to introduce liquid into the passages in a direction opposite to the flow of air. For whatever reason the liquid enters the diffuser passages, the resulting dehydration and formation of solid deposits in the passages is dependent upon the condition of the air in the passages. Evidently, the effects are cumulative; the more rapidly the dehydration of the solids in the pores of the diffuser takes place, the greater the amount of oxidized residues accumulates.

I have discovered that the extent of wet clogging, or clogging due to the sewage liquid seeping down into the diffusers is affected by the capacity of the air to absorb water; this capacity being a function of the humidity, or water content, of the air, the temperature of the air, and its pressure. Very dry air will readily absorb water, while air having a water content close to saturation will not. When dry air passes through the diffuser passages and contacts the sewage mixture which has seeped back into these passages, it absorbs water from this mixture leaving a higher concentration of solids which tends to deposit on the passage walls. As this action continues, more and more solids deposit out. The moving air continues to act on the deposits to oxidise the organic constituents and build up firm inorganic masses which eventually will completely clog the passages.

The fact that atmospheric air must be compressed to cause it to enter the sewage aggravates this condition considerably. This is due to the fact that the act of compression increases the temperature of the air, as well as its pressure, and the increased capacity of the air to absorb water due to this increase in temperature is greater than its decreased capacity to absorb water due to increased pressure.

I have discovered that, if the humidity of the air supply to the diffusers is maintained slightly below saturation of the air at the temperature of the diffusers, wet clogging will be greatly retarded, due to the low capacity of the air to absorb water from the sewage mixture which has seeped back into the passages.

The present invention provides a method and apparatus which maintains the humidity of the air supply to the diffusers at slightly below the saturation point at the diffusers for the purpose of retarding wet clogging. The invention also includes a method and apparatus for adding water to the diffuser air supply to maintain the required humidity, which in addition, cleanses the air to assist in retarding, and to a great extent retarding dry clogging of the diffuser passages.

It is therefore an object of the present invention to provide a method and apparatus to retard the clogging of diffuser media which are used for the introduction of air in a sewage process.

It is a further object of this invention to provide a method and apparatus for a sewage treatment process in which air is introduced efficiently into sewage to be treated in such a way as to minimize interruptions to the process due to diffuser clogging.

Another object of the invention is to maintain the humidity of the diffuser supply air close to the saturation point, thereby greatly retarding clogging due to sewage penetration of diffuser passages.

Still another object of the invention is to provide a method and apparatus to cleanse the diffuser air supply so as to retard clogging due to dust and other foreign material.

It is a still further object of the invention to provide means which will retard both wet and dry clogging by adding water to the diffuser air supply in such a way as to at the same time maintain its humidity and cleanse the air.

Another object of the invention is to provide apparatus which will enable the present method of treatment to be carried out automatically and with relatively simple and inexpensive equipment.

The invention will be readily understood from the following description of an illustrative embodiment thereof, taken in conjunction with the accompanying drawings, wherein, Fig. 1 is a view, partially in elevation and partially schematic, showing a preferred arrangement of equipment to be used in carrying out the invention; Fig. 2 is a sectional view along the line 2—2 of Fig. 1; Fig. 3 is a schematic sectional view enlarged to show a portion of a clogged diffuser plate; Fig. 4 is a graph showing the variation of temperature with pressure in a compression process such as that employed in the present invention; Fig. 5 is a graph showing the variation of capacity of air to absorb water with temperature; Fig. 6 is a graph showing the relationship between the temperatures of the air at the inlet and at the diffuser; Fig. 7 is a section along the line 7—7 of Fig. 1.

Referring to the drawings, a compressor is indicated at 11 which is supplied with air through an intake 12. Air at a relatively constant pressure is delivered by the compressor to an air main 13 which, in turn, is connected through various laterals 14 to risers 15. These risers supply compressed air to diffuser units 16 which may comprise diffuser plate holders 17 and diffuser plates 18. As shown in Fig. 3, these plates comprise a porous media having many small and irregular passages 19. The plates 18 are arranged horizontally having their lower, or dry side, contacting the air supply, and their upper, or wet side, contacting the sewage mixture 21 contained in the aeration tank 20.

In the type of sewage treatment process here being considered, compressed air flows from the compressor 11, through the air main 13, the laterals 14, and the risers 15, to the under side of the porous diffuser plates 18 and thence through the diffuser passages 19 into the sewage mixture 21, where it reacts with the sewage to reduce its organic content by bacterial action and oxidation. As shown in Fig. 3, serious clogging occurs in the passages 19 of the diffuser plates 18. Dry clogging, or that occurring adjacent the dry side of the diffuser plates and due to dust and other foreign matter carried by the air supply, is shown at 22. The more serious wet clogging, occurring adjacent the wet side of the diffuser plates and due to interaction of the air with sewage mixture seeping into the passages, is shown at 23.

As previously mentioned, the fact that air must be compressed to cause it to pass through the diffuser passages 19 considerably accelerates wet clogging. This is due to the fact that compression increases the capacity of the air to absorb water, and this increased capacity causes the air passing through the diffusers to take water from the sewage mixture in the passages at an accelerated rate, thus hastening the deposit of sewage solids therein.

The graph of Fig. 4 illustrates the fact that when air is compressed its temperature is increased in an almost straight-line proportion. The graph of Fig. 5 shows the capacity of air to hold water at different temperatures and pressures. However, in a consideration of the present problem it is necessary to take into account certain other factors, more or less empirical in nature. Because installations of this type are generally massive, and because the air must travel sometimes a great distance between the intake from the atmosphere and the diffuser, there is a heat transfer effect present. Therefore, the graph of Fig. 6 gives a typical set of values for a particular installation, for the temperature of the air to be expected at the diffusers based on its inlet temperature. From this graph it will be seen that the temperature rise is relatively much greater for low atmospheric temperatures, than during periods of relatively hot weather.

As an example of what may be expected, assume that the temperature of the atmospheric air is 40°. If the weather were damp, resulting in 100% humidity, the water capacity of this air would be less than .0005 lb. per cubic foot. According to the graph of Fig. 6, this air would reach the diffusers at approximately 81°. Turning then to the graph of Fig. 5 it will be seen that at this new temperature, the air is capable of holding .00165 lb. per cubic foot at atmospheric pressure, while even at 9 lbs. pressure it can still hold slightly more than .001 lb. of water per cubic foot, which is at least double the amount of water present when it entered the system saturated with water.

At the other extreme, assume that the temperature of the outside air is 90°, and that the humidity is still 100%. When this air reaches the diffusers its temperature will have been raised only to about 99°. The water capacity of free air at 90° is about .00215 lb. per cubic foot, while at 99° it is about .0028 lb. However, it must be remembered that the air at the diffusers is not only at a higher temperature, but is also under increased pressure. Therefore, an examination of the graph of Fig. 5 shows that the capacity of the air at 99° and 7 lbs. pressure is approximately .00185 lb. per cubic foot, and at 9 lbs. pressure, is approximately .00165 lb. per cubic foot. In this case, because the air originally contained .00215 lb. of water per cubic foot, it will be supersaturated at the diffusers. It must be understood that this represents an extreme condition, as it assumed maximum humidity, relatively high outside temperature, and an operating pressure near the top level of normal operation. If the atmospheric humidity were reduced to the neighborhood of 77% or less, with the other conditions remaining the same, the air would be at, or below, saturation when it reached the diffusers at 9 lbs. pressure. Similarly, if the operating pressure were reduced alone, the air could reach the diffusers without being saturated with water.

It is the purpose of this preliminary discussion to show that under most operating conditions, the air which passes through the diffuser media is unsaturated, causing the passages of the diffusers to become clogged, as previously described. The presence of saturated air at the diffusers is not a normal condition, and this phase will be discussed in due course.

To prevent or retard the wet clogging of diffuser passages it is proposed to add water to the air supply, preferably after compression, and to provide means for controlling the addition of this water so as to maintain the humidity of the air at the diffusers just below its saturation point. Any suitable means capable of supplying water to the air and adapted to be controlled to establish a steady condition of humidity may be used. Since it is also desirable to prevent dry clogging, by also cleansing the air, it is simple and efficient to add water by means of a spray arrangement 24 located after the compressor 11 in the air supply main 13. This spray arrangement comprises several nozzles 25 connected to a supply line 26 by a valve 26a to enable the nozzles to emit a controlled amount of water in the air supply.

For controlling the admission of water it is necessary to know at all times the temperature, water content, and pressure, of the air. Inasmuch as the process here considered is usually operated with air supplied at a constant pressure, it is possible to set up appropriate conditions of temperature and water content based on the various air pressures to be used, so that only the two variables may govern the control. Pressure may be recorded by an instrument 27, of conventional type. Water content may be measured and recorded by an instrument 28, which should be spaced sufficiently from the spray 25 so that a steady condition of relative humidity is maintained at the instrument. As previously stated, temperature will vary in different parts of the air system, and since it is the moisture absorbing capacity of the air at the diffusers which is to be controlled, a temperature recording means 29 should be placed as close to the diffuser media 18 as possible. If the instrument 28 is responsive only to relative humidity, it should also be placed near the diffusers, but as a practical matter it may be necessary to place it in some more accessible location in the air line, in which case as arbitrary allowance may be made in the control operation for the difference in the actual reading from the actual condition at the diffuser media.

The recording means 28 may include any of the types well known in the art, such as a wet-and-dry bulb recorder, diaphragm, or dew point instrument, or any other type. An instrument which has been used successfully is the dew point unit of an article made by the Foxboro Company under the trade name of "Dewcel." This device includes electrical resistance heating means whose conductivity is dependent upon moisture contained in the surrounding atmosphere. Equilibrium is sustained as long as the moisture content of the atmosphere remains constant to maintain a uniform output of heat. A variation in the moisture content will produce a corresponding variation in conductivity, and the resultant heat output, until equilibrium is restored by stable conditions of moisture. A conventional thermometer is maintained in heat-exchanging relationship with the heating means whereby the dew point temperature of the surrounding atmosphere will be continuously indicated.

A controller 31 is shown, operatively connected with the recorder 28, the temperature recorder 29, and a control valve 32 in the water supply line 26. Many types of controller may be used for the purpose. One type is the previously mentioned device sold under the trade name "Dewcel." This device receives continuous indications of temperature from device 29, and dew point temperature from device 28, and controls the operation of valve 32. It is therefore provided with adjustable integrating means whereby the valve will be maintained closed as long as device 28 indicates a dew point temperature whose value is less than that of the temperature indicated by device 29 by an amount which does not exceed a predetermined percentage of said last named temperature, and will open valve 32 when this ratio is exceeded. Preferably the operating connections between the controller 31, and the controlled device and recording instruments are electrical, but with appropriate equipment they could be pneumatic, hydraulic, mechanical, or otherwise.

The internal operation of the controller 31 is well understood in the art and forms no part of this invention. This operation is such that it can maintain any given dew point temperature in the air supply in relation to the temperature at the diffuser media by the controlled addition of water to the system. When the instrument 28 is a dew point recorder, the controller 31 will be set to operate the control valve 32 so as to add water to maintain a dew point temperature at the diffusers a few degrees below the temperature at that point. It has been found that approximately 5° F. is a practical margin for normal conditions. If the instrument 28 records relative humidity, the controller 31 will operate to maintain a relative humidity at the diffusers slightly below saturation. In this respect, approximately 95% relative humidity has been found to be most nearly satisfactory, although it is possible to maintain operations with relative humidity at the diffusers as low as 85–90%.

It will be apparent that while automatic operation of the system is desirable, the invention is not limited thus in scope. The present invention is directed to the subject of retarding, or preventing, the clogging of diffuser media, and this can be accomplished by manual operation of the water supply to the air line. In this case, the instruments 28 and 29 would be preferably provided with indicating means to give a remote visual indication at a point near the control for valve 32.

It has been noted above that under certain exceptional conditions the air may reach the diffusers in a saturated, or super-saturated, state, and it was pointed out that this situation is one that can occur only when both the temperature, and relative humidity, of the atmospheric air is high before it is compressed. It is also an undesirable condition, especially when the diffusers have become somewhat clogged, because the excess of water entering the pores of the diffusers tend to cause the deposits therein to swell, and therefore add to the obstruction.

To cope with this special condition, the procedure outlined may be modified to make use of the addition of water to cool the air, then to take advantage of the heat exchange characteristics of the air main to raise the temperature of the air again to a value greater than its dew point, with the excess of water being drained off.

For this purpose, the water is introduced at 24 through a set of rather large nozzles 25a which produce a coarse stream or sheet of water which produces a cooling effect on the air, and is not as readily absorbed in the air as the fine spray emitted by the nozzles 25. The valve 26a is placed in the system to enable the water to be directed to either set of nozzles.

Relatively speaking, a greater amount of water will be added in this case as when it is added merely to increase water content. The purpose of adding water in this modified form of operation is to first reduce the temperature of the air to a value below the temperature of the air main 13, so that even if the air is then saturated with water, when it has traversed the air main it will have been warmed sufficiently to have reduced its relative humidity to a value below 100%. Naturally, an excess of water will be introduced, therefore it will be necessary to provide a trap 33 in the air line to remove this water before it enters the diffusers. A suitable valve 34, such as a float valve, may also be provided to prevent the level of the water in the trap rising into the air main.

In operation, once the valve 26a has been set to deliver water to the coarse nozzles 25a, the same control will be employed as with the system first described, inasmuch as the criterion to be followed is the maintenance of air to the diffusers having a relative humidity slightly less than saturation. There will be one difference, in that with the modified system an increase in the addition of water to the air will result in a lower percentage of relative humidity of the air at the diffusers. This is true because the additional water will produce a greater cooling effect, consequently, when the air is warmed in the air main it will be warmed to a greater extent and the final relative humidity will thus have a lower value. For this type of operation, therefore, the controller 31 will thus be connected to add water to decrease humidity and decrease water to increase humidity at the diffusers.

It will thus be seen that this invention retards and to a great extent prevents clogging of diffuser passages wherein porous media are used for introducing air into a sewage treatment process. The process thus is more efficient and interruptions to operation are minimized. Furthermore, the foregoing can be accomplished automatically and with relatively simple and inexpensive equipment.

I claim:

1. The method of retarding clogging of porous diffuser media used in the activated sludge process of sewage treatment which includes, supplying air under pressure to the diffuser media, the addition of water to the air supplied to the media in excess of the capacity of the air to absorb it at a point spaced from the diffuser media, regulation of the quantity of water so supplied to maintain the air entering the media between the limits of 90–100 percent saturation, and removing the unabsorbed water before it enters the diffused media.

2. The method of retarding clogging of porous diffuser media used in the activated sludge process of sewage treatment in which atmospheric air having varying temperatures is supplied to the diffuser media under pressure, including the addition of water to the air supplied under pressure, and regulation of the quantity of water so supplied to maintain the air entering the diffuser media between the limits of 90–100 percent saturation.

3. The method as defined in claim 2, in which water is added at a point spaced from the diffuser media in a coarse spray in excess of the capacity of the air to absorb it, and unabsorbed water is removed before it enters the media.

4. In the treatment of sewage in aeration tanks by the activated sludge process in which atmospheric air having seasonally high relative humidity and temperature characteristics is supplied to diffuser media in the tank under pressure through conduit means having relatively high heat-transfer characteristics, the method which includes, continuously adding an excess amount of water to the air before it enters the conduit means to cool the air to a temperature below that of the conduit means, and removing unabsorbed water, the temperature of the air being raised in traversing said conduit means, the amount of water added to the air being regulated so that the relative humidity of the air at the diffuser media will be at, or below, saturation to retard clogging of the media.

5. Apparatus for treating sewage including, in combination, diffuser media having minute passages therethrough, means for maintaining a continuous stream of atmospheric air under pressure to the passages to be diffused into sewage to be treated, means for introducing a spray of water into the air stream remote from the passages, means for regulating the water spray, and controlling means responsive to the relative humidity of the air stream at the passages and effective upon the regulating means to maintain the relative humidity of the air stream at the passages at a constant value.

6. Apparatus for treating sewage including, in combination, diffuser media having minute passages therethrough, conduit means through which air continuously supplied under constant pressure having variable relative humidity is subjected to a relatively constant temperature gradient and delivered to the passages in the diffuser media to be diffused in sewage to be treated, means to alter the water-content of the air before it is subjected to said temperature gradient, and proportioning means responsive to the condition of the air after it is subjected to said temperature gradient and effective on the water-content altering means to maintain the water-content of the air delivered as a relatively constant function of the temperature of said delivered air.

7. Apparatus for treating sewage including, in combination, diffuser media having minute passages therethrough, conduit means through which air continuously supplied under constant pressure having variable relative humidity is subjected to a relatively constant temperature gradient and delivered to the diffuser media to be diffused in sewage to be treated, means for altering the water-content of the air before it is subjected to said temperature gradient, means to indicate the relative humidity of the air after being subjected to said temperature gradient, and controlling means responsive to said relative humidity indicating means and effective upon said means for altering the water-content to maintain the water-content of the air delivered as a relatively constant function of the temperature of said delivered air.

8. Apparatus for treating sewage including, in combination, diffuser media having minute passages therethrough, conduit means through which air continuously supplied under constant pressure having variable relative humidity is subjected to a relatively constant temperature gradient and delivered to the diffuser passages to be diffused in sewage to be treated, means for adding water to the air before it is subjected to said temperature gradient, means for indicating the temperature of the air after it is subjected to said temperature gradient, means for indicating the water-content of the air after the addition of water, and controlling means effective upon said means for adding water and responsive to said temperature indicating means and said water-content indicating means to maintain relatively constant the relative humidity of the delivered air.

References Cited in the file of this patent

UNITED STATES PATENTS

| Number | Name | Date |
| --- | --- | --- |
| 1,889,078 | Schiechel | Nov. 29, 1932 |
| 2,184,613 | Evleth | Dec. 26, 1939 |
| 2,208,740 | Touton | July 23, 1940 |
| 2,294,973 | Ford | Sept. 8, 1942 |
| 2,318,728 | Werking | May 11, 1943 |
| 2,430,749 | Van Denburg | Nov. 11, 1947 |